US010614417B2

(12) United States Patent
Rafferty et al.

(10) Patent No.: US 10,614,417 B2
(45) Date of Patent: Apr. 7, 2020

(54) SYSTEM AND METHOD FOR ELECTRONIC LEAD VERIFICATION

(75) Inventors: Steven M. Rafferty, Austin, TX (US); Rickie N. Benavidez, Kyle, TX (US); Alexander K. Wolfe, Austin, TX (US); Michael Shapiro, Hoboken, NJ (US)

(73) Assignee: ActiveProspect, Inc., Austin, TX (US)

( * ) Notice: Subject to any disclaimer, the term of this patent is extended or adjusted under 35 U.S.C. 154(b) by 1552 days.

(21) Appl. No.: 13/106,641

(22) Filed: May 12, 2011

(65) Prior Publication Data

US 2012/0290491 A1 Nov. 15, 2012

(51) Int. Cl.
*G06Q 10/10* (2012.01)
*G06Q 30/02* (2012.01)

(52) U.S. Cl.
CPC ............ *G06Q 10/10* (2013.01); *G06Q 30/02* (2013.01)

(58) Field of Classification Search
CPC combination set(s) only.
See application file for complete search history.

(56) References Cited

U.S. PATENT DOCUMENTS

| 6,868,389 | B1 | 3/2005 | Wilkins et al. |
| 7,206,746 | B1 | 4/2007 | McIntosh |
| 7,363,495 | B2* | 4/2008 | Felt et al. ..................... 713/170 |
| 7,747,545 | B2* | 6/2010 | Gleim et al. .................... 706/8 |
| 8,296,176 | B1* | 10/2012 | Chatwin et al. ............ 705/7.29 |
| 2001/0047340 | A1* | 11/2001 | Snow .................... G06Q 30/06 705/58 |
| 2006/0165260 | A1* | 7/2006 | Vanjani ................ G06Q 30/018 705/317 |
| 2009/0037253 | A1* | 2/2009 | Davidow et al. ............... 705/10 |
| 2009/0164477 | A1* | 6/2009 | Ganguly ............... G06Q 30/02 |
| 2010/0131835 | A1* | 5/2010 | Kumar et al. ................ 715/205 |
| 2012/0232955 | A1* | 9/2012 | Riazzi et al. ............... 705/7.32 |
| 2012/0290491 | A1* | 11/2012 | Rafferty et al. ............. 705/317 |

OTHER PUBLICATIONS

Notification of Transmittal of the International Search Report and yje Written Opinion of the International Searching Authority, or the Declaration dated Sep. 7, 2012 in connection with International Patent Application No. PCT/US2012/37624.
International Search Report dated Sep. 7, 2012 in connection with International Patent Application No. PCT/US2012/037624, 4 pages.
Written Opinion of International Searching Authority dated Sep. 7, 2012 in connection with International Patent Application No. PCT/US2012/037624, 5 pages.

* cited by examiner

*Primary Examiner* — Julie M Shanker

(57) ABSTRACT

A system and a method provide a lead verification service. A lead generator contacts a verification server when a visitor lands on a hosting site of the lead generator to enter lead information into a form. The verification server issues a reference key (token) to the lead generator and collects information about the visitor and the hosting site of the lead generator, using the reference key to identify the collected information. When the visitor submits the form, the lead generator sends the form data, which includes the entered lead information and the reference key received from the verification server, to at least one interested party. When the verification server receives a request for the collected information from the interested party, the collected information is retrieved based on the reference key included in the request and sent to the requesting interested party.

20 Claims, 6 Drawing Sheets

SYSTEM AND METHOD FOR ELECTRONIC LEAD VERIFICATION

TECHNICAL FIELD OF THE INVENTION

The present disclosure is directed, in general, to communication systems, and more specifically, to a system and method for verifying a lead that was collected from a website.

BACKGROUND OF THE INVENTION

"Lead generation" generally refers to the creation or generation of prospective consumer interest or inquiry into products or services of a business. There has been a recent trend towards lead generation using the Internet. In a typical lead generation scenario, a consumer completes an online request form on a website. When the form is completed and submitted, the consumer's information may be sent to a party interested in the data or alternatively evaluated to match the consumer with one or more appropriate providers. Typically, the lead generation website is owned and operated by one party (the lead seller) while a separate party receives the data (the lead buyer).

Currently, there are no reliable means for a lead buyer to verify when and where an Internet lead was collected by a lead seller. Since the lead seller hosts the web form, the buyer that purchases leads has no control of the form used to collect the lead and therefore may not be able to verify where the lead was collected or if it was even collected on a web form. The lead buyer is unable to verify basic information about the lead and is therefore unable to verify the authenticity of the lead. On what website was it collected? What information was presented to the consumer on the web page? When was it collected? Was it submitted by a consumer from a web browser? What was the IP address of the consumer submitting the lead? To answer these questions the buyer must rely on the word of the seller with no way to independently verify. Because of this basic lack of transparency it is easy for a lead seller to take advantage of a lead buyer by misrepresenting when, where and how leads were collected. For example, a lead seller may represent that the lead was collected on one site when it was in fact collected on another.

As such, there is a need for an improved means for independently verifying the authenticity of leads that are generated from lead generating websites.

SUMMARY OF THE INVENTION

According to one aspect of the present invention, a method of providing a verification token (aka certificate of authenticity) with an internet lead is provided. A verification server is notified when a visitor accesses a web page to enter information into a form. A reference key comprising a unique identifier is received from the verification server. And in response to the visitor submitting the form, the form data is sent to at least one interested party. The form data includes the reference key and the information entered by the visitor.

According to another aspect of the present invention, a method of a verification server for supporting a lead verification service is provided. A reference key that includes a unique identifier is generated in response to receiving a notification from a lead generator on a website that is being accessed by a visitor. The reference key is sent to the lead generator. Information about the lead generator and the visitor that is accessing the website is collected. The collected information is associated with the reference key. The collected information is sent to at least one interested party in response to receiving a valid request comprising the reference key.

According to another aspect of the present invention, a system for supporting a lead verification service is provided. The system includes a verification server and a web server that is hosting a website comprising a lead generator. The lead generator is configured to notify the verification server when a visitor accesses the website to enter information into a form, receive a reference key comprising a unique identifier from the verification server, and send the form data to at least one interested party in response to the visitor submitting the form, the form data comprising the reference key and the information entered by the visitor.

According to yet another embodiment of the present invention, an apparatus for supporting a lead verification service is provided. The apparatus includes a communication interface, a memory, and a processor. The communication interface sends and receives information. The memory stores instructions for providing lead information that can be verified. And the processor performs the instructions stored in the memory to generate a verification token that includes a unique identifier in response to receiving a notification from a lead generator on a website that is being accessed by a visitor, send the verification token to the lead generator, collect information about the lead generator and the visitor that is communicating with the lead generator, and send the collected information to an interested party, in response to receiving a valid request, based on the verification token.

In some embodiments, the system ensures that the information collected and associated with a particular reference key is valid. When the lead generator communicates with the verification server, there are multiple interactions between the systems (i.e. the verification server and the system on which an instance of the lead generator is being executed) to help ensure that the information collected is accurate and the lead generator is not trying to misrepresent that information.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system. This invention may, however, be embodied in many different forms and should not be construed as limited to the embodiments set forth herein. Rather, the disclosed embodiments are provided such that this disclosure will be thorough and complete, and will fully convey the scope of the invention to those skilled in the art. The principles and features of this invention may be employed in varied and numerous embodiments without departing from the scope of the invention.

Furthermore, well known or widely used techniques, elements, structures, and processes may not be described or illustrated in detail to avoid obscuring the disclosure. Although the drawings represent embodiments of the disclosure, the drawings are not necessarily to scale and certain features may be exaggerated or omitted in order to better illustrate and explain the present invention.

Embodiments of the present disclosure assume that lead sellers will want to provide a certificate of authenticity with every lead. Doing so lends credibility as they are willing to have their leads independently verified by a third party. Embodiments of the present disclosure also assume that an unscrupulous lead vendor would want to trick a verification server into misreporting the URL of a page where a lead was collected. Without proper means of authentication these unscrupulous lead vendors would be free to misrepresent an Internet lead while maintaining the appearance of being a trustworthy vendor. Embodiments of the present disclosure take a passive approach to solving this problem by quietly monitoring attempts to circumvent the verification process. The verification server does not expose to the lead vendor which checks are being performed when generating a reference key (e.g. verification token) that can later be used by a lead buyer to verify the authenticity of the lead information. Instead, each reference key is used to register a list of "suspicions" that are internally monitored for malfeasance. Suspicions can be used to register a level of confidence that the information collected and associated with a reference key was legitimately generated.

Figure 1:
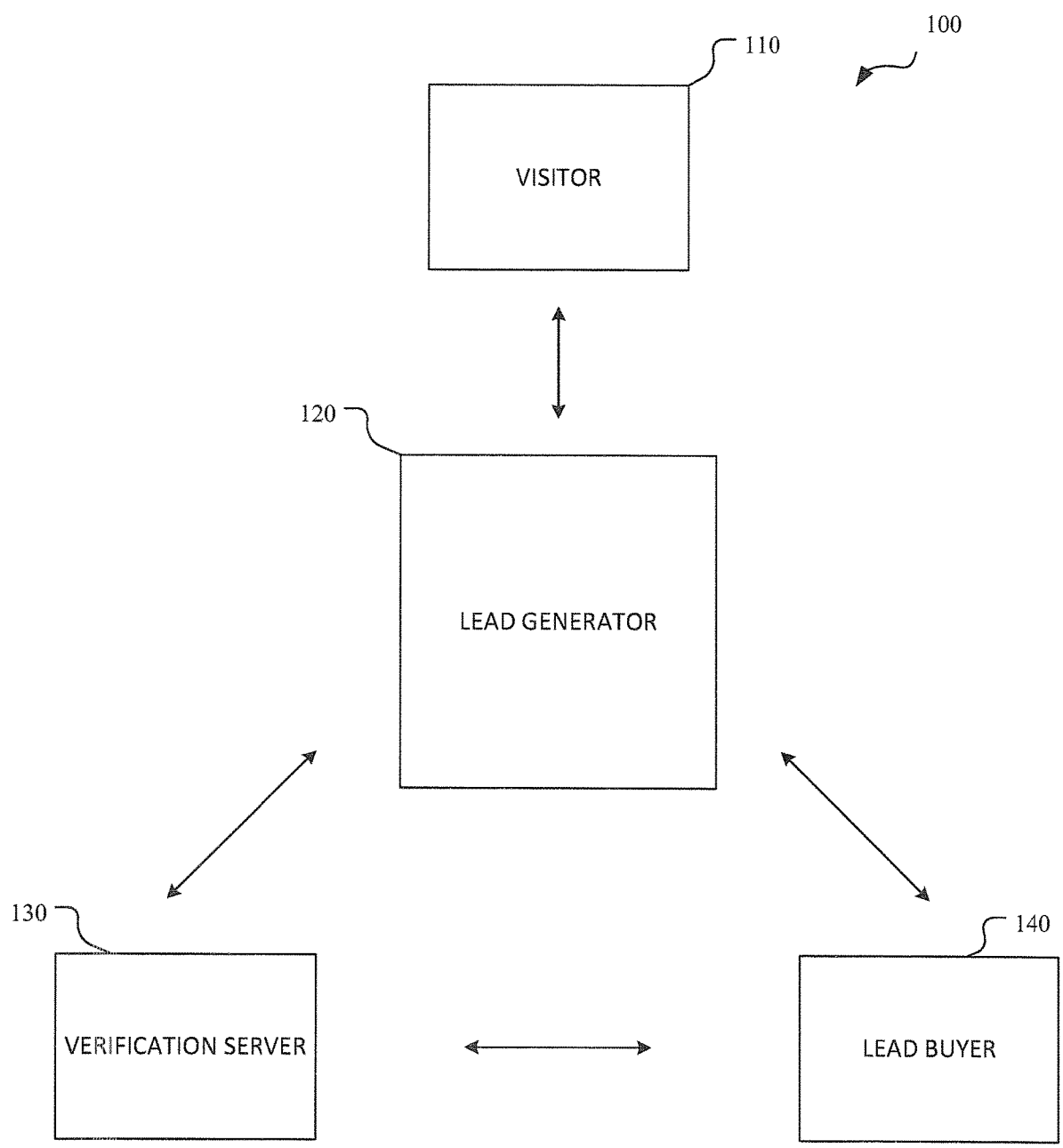
FIG. 1 illustrates a simplified block diagram of a communication system may be utilized according to an embodiment of the present disclosure.

FIG. 1 is a simplified block diagram illustrative of a communication system 100 that may be utilized by various embodiments of the disclosure. The communication system 100 includes a visitor 110, a lead generator (e.g. lead seller) 120, a verification server (also referred to as a "trust form server") 130, and at least one lead buyer 140. The communication system 100 may be utilized to facilitate communication between the described elements 110-140 through a private communication network (such as a local area network (LAN)) or a public communication network such as the Internet in order to allow verification of a lead provided by the lead generator 120. In other configurations, the communication system 100 may utilize any other suitable communication technology.

As used herein, each of the elements 110-140 may generally refer to any object, device, server, software, web page, or any combination of the preceding that is generally operable to communicate with another element. The elements 110-140 may also represent a user profile representing a person. The user profile may comprise, for example, an address for the user, a user name, a pass code, other user information, or any combination of the preceding. Additionally, the elements 110-140 may represent a device that comprises any hardware, software, firmware, or combination thereof operable to communicate through the communication system 100.

The visitor 110 may be a user (e.g. a consumer) or a computing device (e.g. a personal computer, a laptop, a mobile device, and such) controlled by the user to communicate with the lead generator 120 and submit contact information (e.g. lead data).

The lead generator 120 may be a website, a software program, a service, a form or script embedded onto a web page, or a web server that hosts a web page through which the visitor 110 may submit lead data. Lead data may include, but is not limited to, contact information of a person or entity, the type of product or service that the person or entity is interested in purchasing, information related to pre-qualification to a purchase, purchase preferences, and any other information that may generally be gathered concerning the visitor 110. The lead generator 120 may also refer to the hosting page that hosts a script for supporting the lead verification service. When the visitor accesses the web page that hosts the lead generator 120, the lead generator 120 may be executed in the visitor's browser.

According to certain configurations, the lead generator 120 may embed a script onto a web page that contains a form (e.g. hosting page) for submitting lead information. The script may also be placed on any web page (including those that don't contain the form). The script may be written in any appropriate language (e.g. Pert, JavaScript, Ruby, Python, and such) and installed by the publisher of the hosting page or form. When the visitor 110 establishes a connection with the lead generator 120, the lead generator 120 notifies the verification server 130. According to an embodiment, a series of scripts may be loaded by a visitor's browser from the verification server, the verification server generates a certificate for every visit to a page. According to an embodiment, the notification may comprise a request for a reference key that can be used to verify the lead information submitted by the visitor 110. Upon receiving the reference key from the verification server 130, the lead generator 120 associates the lead information submitted by the visitor 110 with the reference key and sends the reference key along with the lead information to at least one lead buyer 140.

In certain configurations, the lead generator 120 may determine the appropriate lead buyer 140 based on the lead information. For example, any one or more of the contact information, qualification attributes, type of product or service requested, and such, may be used to determine to which lead buyers 140 the lead information should be sent. In addition, the appropriate lead buyer(s) 140 may be selected based on any additional scheme. For example, the lead buyers may be notified of the newly submitted lead information and be given the opportunity to purchase the lead information. In other configurations, the lead generator 120 may simply send lead information to a pre-programmed destination. Furthermore, although FIG. 1 shows a direct communication between the lead generator 120 and the leader buyer 140, in certain configurations, there may be intermediate elements between the two.

The verification server 130 performs operations related to storing information that may be used to verify the lead data collected by the lead generator 120. In particular configurations, the verification server 130 collects information about the visitor 110 and the lead generator 120 during the communication session during which the lead generator 120 receives contact information and other relevant information (i.e. lead data) submitted by the visitor 110.

The information collected by the verification server 130 may include, but is not limited to, the Uniform Resource Locator (URL) of the hosting page (where the script is located) and/or the form where the lead data is being collected, Hypertext Transfer Protocol (HTTP) headers for the web page (e.g. for the lead generator or User-Agent) from the visitor 110's browser, date and time that the visitor arrived at the hosting page or submitted the lead data, and the internet protocol (IP) address of the visitor 110. Additionally, in particular configurations, the verification server 130 may capture a screenshot of the hosting page or the form being submitted by the visitor 110 and/or text associated with a form that may be populated by a visitor accessing a website for the form. For example, in particular configurations, the text may be associated with terms or conditions corresponding to a form. The collected information may be stored in a certificate that can later be retrieved by at least one lead buyer 140 to verify the authenticity or validity of the corresponding lead data purchased or acquired from the lead generator 120.

In particular configurations, the verification server 130 may be a computer system that communicates with the lead generator 120 and at least one lead buyer 140. When contacted by the lead generator 120, the verification server 130 generates the reference key (e.g. a token) and sends the reference key to the lead generator 120. The reference key may be included in a token and comprise a string of unique alphanumeric characters that becomes associated with the certificate (i.e. information collected by the verification server 130) and the lead data collected by the lead generator 120. This information together (lead data and reference key) may be communicated to a lead buyer 140.

When the lead buyer 140 sends a request for the certificate along with the reference key, the verification server 130 sends information corresponding to the certificate or the certificate, itself, to the lead buyer 140.

In particular configurations, the lead buyer 140 may be a product/service vendor, computer, or an online account that represents the vendor. According to an embodiment, the verification server 130 may only provide information corresponding to the certificate or the certificate, itself, to a lead buyer that subscribes to the verification service. In this configuration, the lead buyer 140 must be a subscriber of the verification service in order to receive the certificates from the verification server 130. The certificate will include the information collected by the verification server 130 about the visitor 110 and the hosting page of the lead generator 120 during the submission of the lead data. According to the embodiment, the certificate may include one or more of the information described in Table 1.

TABLE 1

| INFORMATION | DESCRIPTION |
|---|---|
| Page URL | where the lead was collected, and the URLs of any containing pages, in the event that inline frames (IFrames) are employed on the hosting page |
| HTTP Headers | from the browser of visitor 110, regarding the lead generator |
| Date & Time | when the visitor 110 arrived at the hosting page to submit the lead information |
| IP address | of the visitor 110 |
| Form information | Any information associated with a form filled out by a visitor, including the form displayed and the text associated with the form |

In particular configurations, data may be collected by the verification server 130 and not sent to the lead buyer 140. Rather, a subset of information may be sent.

According to certain configurations, the verification server 130 may ignore or actively avoid collecting any personally identifiable information about the visitor 110 in order to maintain privacy and integrity. Any personal information that may have been inadvertently collected may not be included in the certificate data that is sent to the requesting lead buyer 140. For example, when capturing the page URL, where the lead is collected, it is possible that additional data is captured as additional parameters appended to the page URL. As the data appended to the page URL is at the discretion of the publisher of the hosting page, personal information that is appended to the URL (e.g. name of the lead or traffic data) may inadvertently be collected by the verification server 130, which captures the complete URL. According to an embodiment, the verification server 130 may hide or remove the personal information that is appended to the captured URL of the hosting page for the lead generator 120.

Because the script installed on the lead generator 120 only causes the verification server to be notified and to include the reference key (i.e. token) into the lead form, changes regarding the type of verification information that is collected to authenticate the lead generator 120 only need to be implemented by the verification server 130. This allows the verification server to be flexible in modifying or enhancing verification techniques as lead vendors become savvier and HTML code becomes more advanced. As such, the entire process can be easily altered without requiring intervention or allowing interference from lead vendors. Put another way, the authentication process can be changed at any time without any coordination with the lead vendors who have chosen to implement the script.

Figure 2:
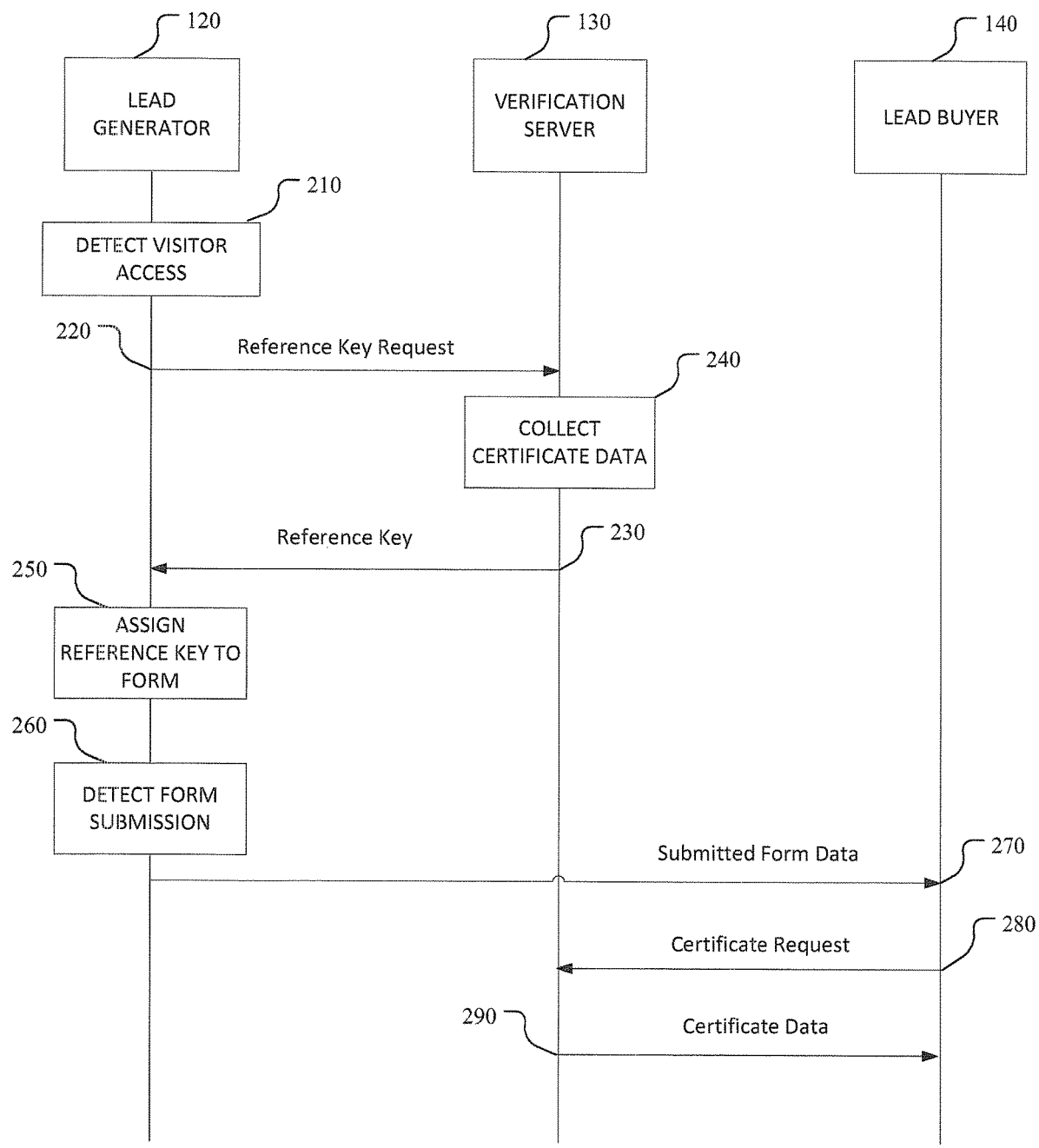
FIG. 2 illustrates the interactions among components in a communication system for verifying a lead according to an embodiment of the present disclosure.

FIG. 2 illustrates the interactions in a communication system for verifying a lead according to an embodiment of the disclosure. In block 210, the lead generator 120 detects that a visitor (e.g. visitor 110) has accessed the hosting page for submitting lead information. When the visitor accesses the host page of the form, the lead generator 120 (which is being executed in the visitor's browser) executes a script that was embedded in the form by the lead vendor to send a reference key request 220 to the verification server 130. The reference key request 220 may include information about the user-agent of the visitor browser, the visitor's IP address, a timestamp, and the URL of the form. In other configurations, the reference key request 220 may occur at any suitable time. In certain configurations, notifying the verification server 130 may constitute a request for a reference key.

Upon receiving the reference key request 220, the verification server 130 issues the reference key 230 to the lead generator 120. The verification server 130 may also begin to collect information about the visitor and/or the lead generator 120 in block 240. The collected information becomes associated with the reference key 230. As discussed above, in certain configurations, the collected information and the reference key 230 is stored as a certificate that can be identified by the reference key 230 on the verification server 130. In certain configurations, the verification server 130 may begin collecting the information in block 240 upon receiving the reference key request 220 and concurrently with or prior to issuing the reference key 230.

According to an embodiment, issuing the reference key 230 may comprise a two-step process to ensure that the scripts loaded from the verification server 130 are not altered. In a first step of the embodiment, the lead verification server 130 captures the relevant data from the reference key request 220 (e.g. information about the user-agent of the visitor browser, the visitor's IP address, a timestamp, and the URL of the form) as described with reference to block 240, stores the captured data into a document (e.g. certificate) and sends a script download token to visitor's browser that is executing the lead generator 120. The script download token (e.g. reference key) is embedded in a first script which is returned to and executed in the visitor's browser. The purpose of the first script returned to the visitor's browser in the first step is to request a second script which will insert the URL of the corresponding document stored in the verification server 130 into the form of the lead generator 120. The request for the second script contains the URL of the browser's document location and the "script download token" generated during the first step. If the lead generator 120 or a lead vendor tries to skip the first step, then the verification server 130 will record a suspicion in the document generated during the first. Suspicions will also be recorded if the IP addresses or user-agents of the first and second steps do not match, or if the script download token has already been used or cannot be found. In an embodiment, the script download token may self-destruct or be rendered useless after a predetermined time period (e.g. 120 seconds), thereby preventing a lead vendor from generating them in bulk for later use. In some embodiments multiple processes may also be used on consecutive requests as a way to confuse unscrupulous vendors. In this way, the verification server 130 may ensure that the scripts are being loaded directly from the verification server 130, thereby thwarting an unscrupulous vendor that may try downloading the script, altering it, and then inserting the altered script into the lead generator 120 being run in the visitor's browser. This would also prevent the vendor from issuing reference keys or other false URLs of the verification certificate.

According to some embodiments, the verification server 130 may want to ensure that the scripts are being performed in the visitor's browser. By including a script that must be successfully executed, the verification server 130 may ensure that the script is being executed in an appropriate script interpreter, rather than just parsed as a string for pertinent information. For example, the verification server 130 may perform a calculation during the first step and ask the browser to perform the same calculation. The verification server 130 would check the visitor browser's calculation during the second step. If the calculations do not match, then a suspicion would be registered in the corresponding certificate. Obfuscation of the script code returned to the visitor's browser can be used to prevent simple parsing by the lead vendor's code. This would be most effective if the obfuscation techniques are rotated in random ways, making it difficult for the lead vendor's server-side code to fetch information out of the script without actually evaluating it in a script engine.

The verification server 130 may also count the number of certificates generated by requests from the same IP address. If a high number of certificates are being generated by the same IP address, then a suspicion would be recorded with the corresponding certificates. In another embodiment, certain script calls to a document object model in the hosting page can be used to ensure that the script interpreter executing the code is being run in a browser rather than in a stand-alone interpreter like Rhino or V8.

In particular configurations, the verification server 130 may also continue to monitor the hosting page of the lead generator 120 over time, thereafter. As mentioned previously, reference key 230 may be included in a token and comprise a string of unique alphanumeric characters. The verification server 130 may generate or assign the reference key 230.

In block 250, the lead generator 120 associates the received reference key 230 with the form that is being populated by the visitor for submission of lead information. According to certain configurations, the reference key 230 may be stored in a hidden field of the form. In the hidden field, the reference key 230 may also be included in a certificate URL that can be used to access the stored certificate on the verification server 130.

In block 260, the lead generator 120 detects that the visitor has completed the form and submitted the lead information. The lead generator 120 then sends the submitted form data 270 to at least one lead buyer 140 or alternatively to an intermediate element that may, in turn, submit the data to the lead buyer 140. The submitted form data 270 includes the lead information and the reference key 230.

The lead buyer 140 may then send a certificate request 280 to the verification server 130 to verify, among other things, the authenticity of the lead information that was included in the received form data 270. According to an embodiment, the lead buyer 140 may include the reference key 230 in the certificate request 280. Alternatively, if the certificate URL is included in the form data 270, the lead buyer 140 may attempt to access the certificate URL, which may be constituted as the certificate request 280.

Upon receiving the certificate request 280 (which includes the reference key 230), the verification server 130 may retrieve the stored certificate based on the reference key 230 and send the certificate data 290 to the lead buyer 140. In an embodiment, the verification server 130 may first determine whether the lead buyer 140 is a valid subscriber to the verification service before sending the certificate data 290.

Figure 3:
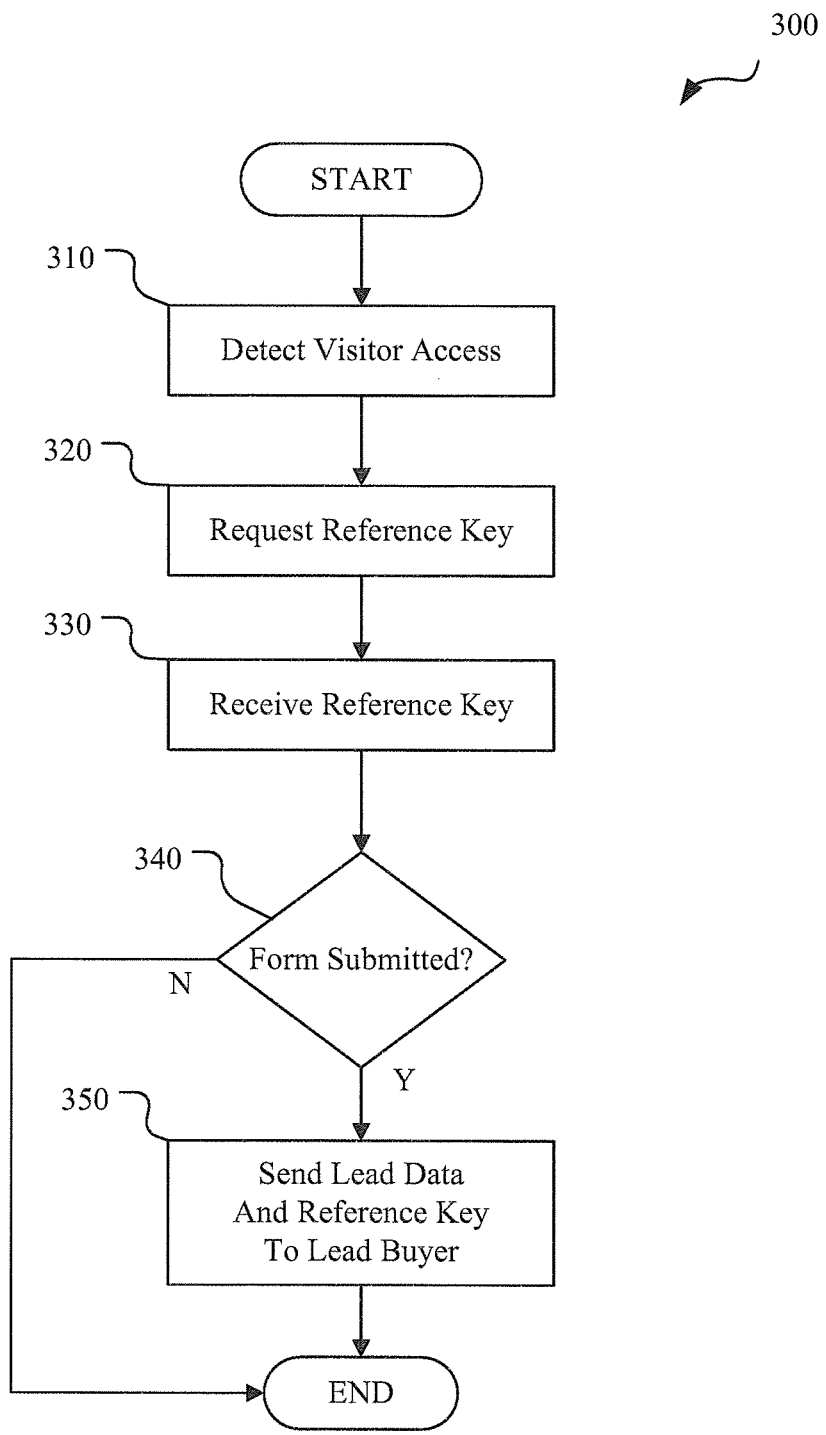
FIG. 3 illustrates a process in a lead generator for providing a lead that can be verified according to an embodiment of the present disclosure.

FIG. 3 illustrates a process 300 in a lead generator for providing a lead that can be verified according to an embodiment of the present disclosure. The lead generator may be any web page, form, or script on a hosting page where a visitor may submit their lead information, such as lead generator 120.

In block 310, the lead generator detects that a visitor has landed on the hosting page that contains the form for submitting lead information. In block 320, the lead generator sends a request for a reference key to a verification server (e.g. the verification server 130). In certain configurations, the lead generator simply notifies the verification server that a visitor has landed on the hosting page.

In block 330, the reference key is received and assigned to the instance of the form that the visitor is using to submit the lead information. According to certain configurations, the reference key is stored in a hidden field on the form and may be included in a certificate URL.

In block 340, the lead generator determines whether the form has been submitted. If the form is not submitted, the process 300 ends. According to an embodiment, the lead generator may determine that the form is not submitted if the form is not submitted within a specified period, the web browser is closed before the visitor submits the lead information, or the visitor navigates away from the hosting page without submitting the lead information.

In contrast, if the form is submitted, the lead generator sends the lead data to at least one lead buyer in block 360 (or alternatively to an intermediate element that is in communication with the lead buyer) and ends the process. According to certain configurations, the lead generator may determine to which lead buyer(s) the lead information is to be sent based on at least a portion of the lead information in the submitted form.

Figure 4:
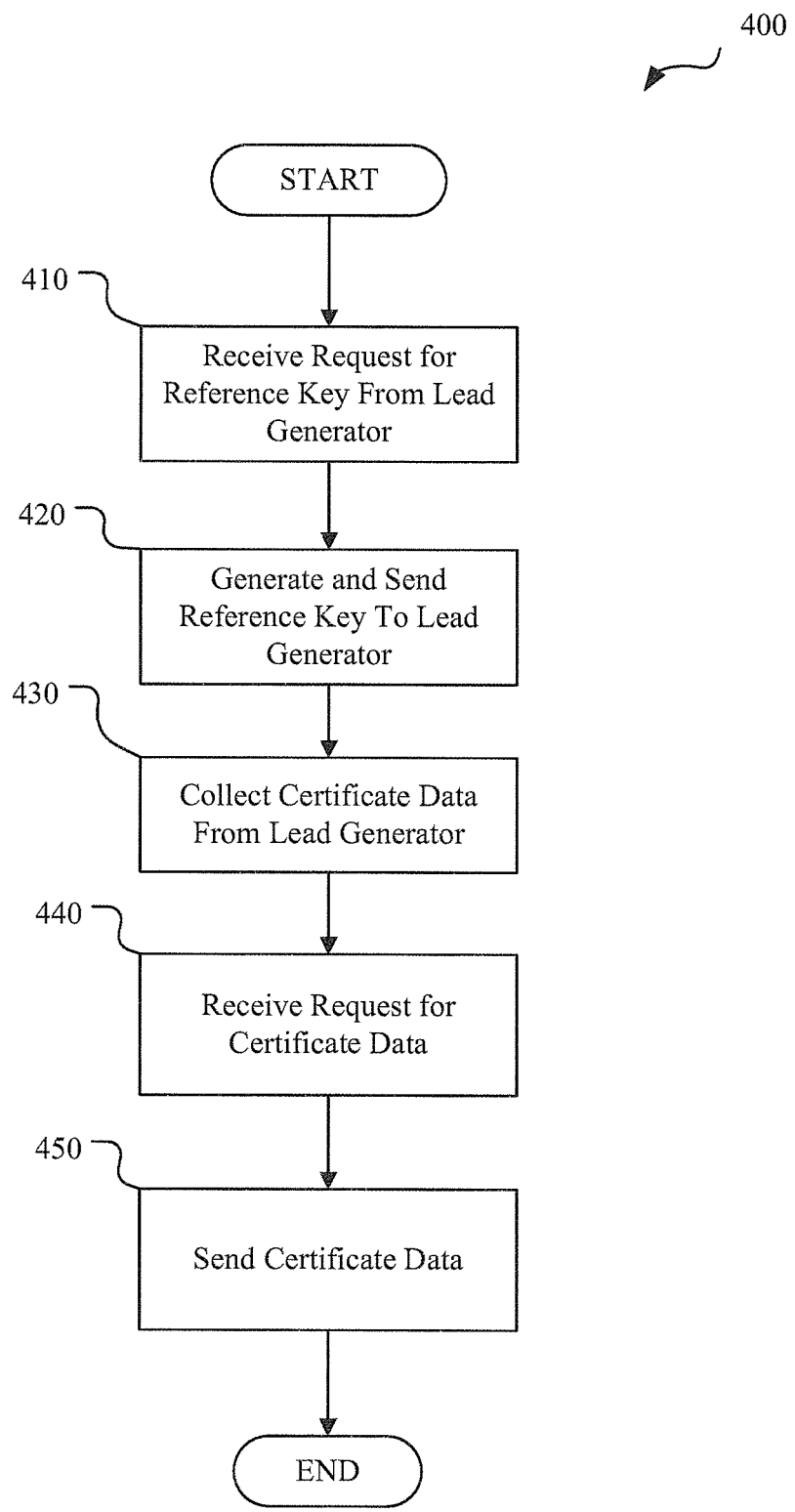
FIG. 4 illustrates a process in a verification server for supporting the lead verification service according to an embodiment of the present disclosure.

FIG. 4 illustrates a process 400 in a verification server for supporting the lead verification service according to an embodiment of the present disclosure. The verification server (e.g. the verification server 130) may be a computer system that communicates with at least one lead generator (e.g. the lead generator 120) and at least one lead buyer (e.g. the lead buyer 140).

In block 410, the verification server receives a request for a reference key from a lead generator. As described earlier, the request may simply be a notification that a visitor has landed on a hosting page of the lead generator. In block 420, a reference key is generated and sent to the requesting lead generator. In an embodiment, the verification server may generate a token that serves as the reference key and send the token to the lead generator.

In block 430, the verification server begins to collect information about the visitor the hosting page of the lead generator that requested the reference key. The information collected by the verification server may include, but is not limited to, the Uniform Resource Locator (URL) of the hosting page or form where the lead data is being collected, Hypertext Transfer Protocol (HTTP) headers for the web page (e.g. for the lead generator or User-Agent) from the visitor's browser, date and time that the visitor arrived at the hosting page or submitted the lead data, and the internet protocol (IP) address of the visitor. Additionally, the verification server may capture a screenshot of the hosting page or the form being submitted by the visitor and/or text associated with a form that may be populated by the visitor accessing a website for the form. For example, in particular configurations, the text may be associated with terms or conditions corresponding to a form. The collected information may be stored in a certificate or some other data structure that can be identified by the reference key. In certain configurations, the verification server may continue to monitor the hosting page of the lead generator over time and, as appropriate, provide such monitored information to a lead buyer. Additionally, according to certain configurations, the verification server may take affirmative steps to not collect any personally identifiable information about the visitor or traffic data and/or may remove such personally identifiable information.

In block 440, a request for certificate data is received. The request may be transmitted from a lead buyer that purchased or acquired lead information that included the reference key.

In block 450, the certificate data that corresponds to the reference key included in the request is transmitted to the lead buyer that sent the request. That is, the verification server determines the reference key from the request for certificate data, retrieves the corresponding certificate data (or data structure) based on the reference key, and sends the retrieved certificate data to the lead buyer. In particular configurations, monitored information may additionally be communicated to the lead buyer.

According to certain configurations, the verification server may first determine whether the lead buyer is a subscriber of the verification service or has appropriate access to the certificate data before sending the certificate data. For example, the verification server may request a password, or the request for certificate data may include authentication information that identifies the lead buyer. If the requesting lead buyer does not have access, the verification server may not send the requested certificate data.

According to certain configurations, as alluded to above, the verification server may also check the certificate data to ensure that personal information of the visitor or traffic information that reveals the referrer of the lead generator is not sent with the certificate data.

Figure 5:
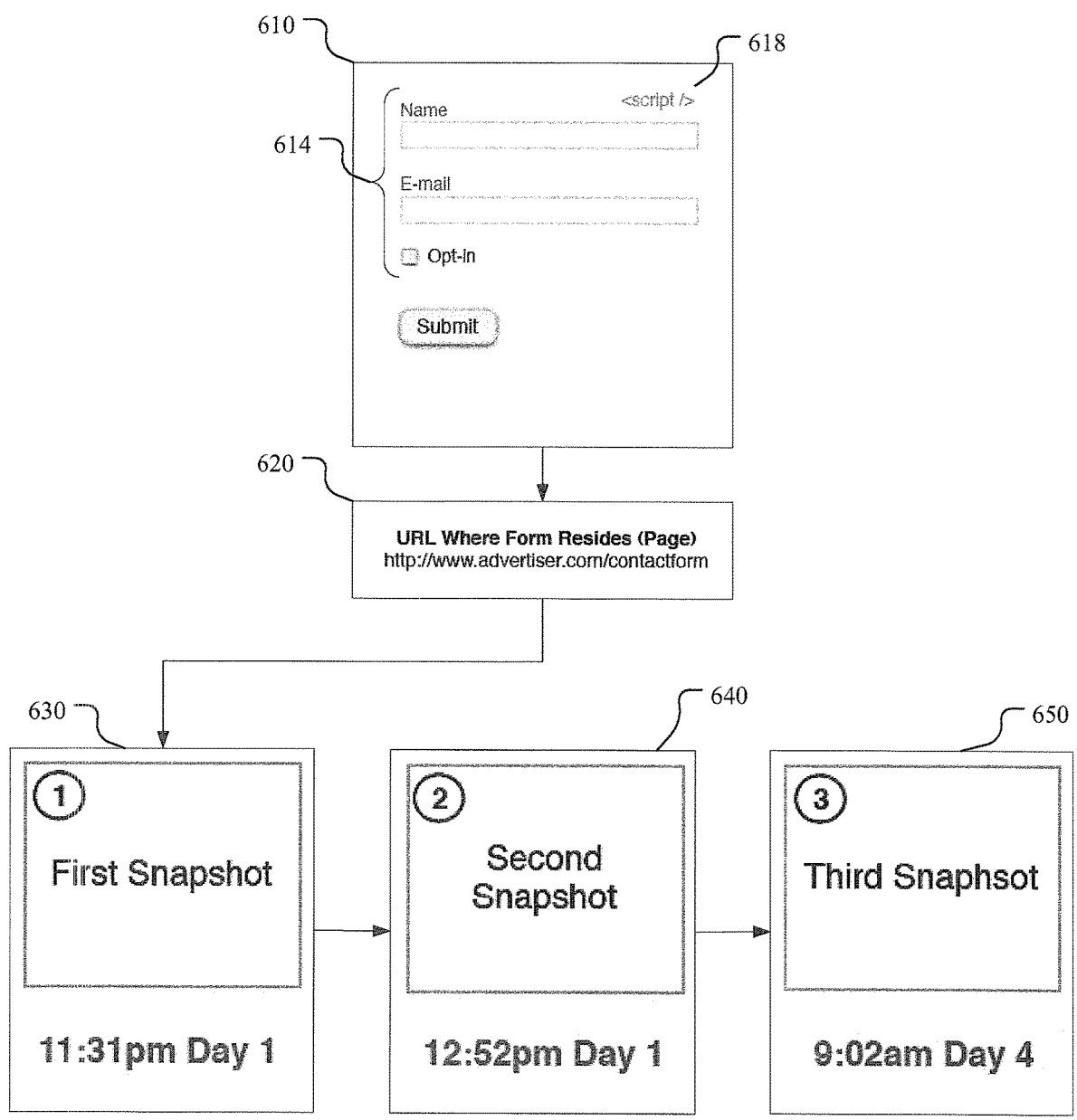
FIG. 5 illustrates an example of monitoring a web page that hosts the lead generator according to an embodiment of the present disclosure.

FIG. 5 illustrates an example of monitoring a web page that hosts the lead generator according to an embodiment of the present disclosure. Web page 610 is hosted on a lead vendor's server. The web page 610 contains a form 614 and a script 618 that has been added by the lead vendor. When executed by a visitor's browser, the script 618 on the web page 610 (e.g. lead generator 120) communicates with the verification server 130. In a request for a reference key, the script 618 provides to the verification server 130 the URL 620 of the web page 610 where the form 614 resides. At this point, the verification server 130 is "aware" of the URL of the form 614 and begins to monitor the web page 610 for any changes. The changes to the web page 610 may be presented in an event timeline as shown in sample snapshots 630-650. The first snapshot 630 of the web page 610 may be taken when the verification server first receives a notification (or reference key request) from the script 618. From there on, the verification server 130 monitors the web page 610. The second and third snapshots 640 and 650 are taken when the changes are detected by the verification server 130. According to an embodiment, for each change detected, snapshots of the web page 610 are captured including at least one of the HTML, image files, and a high-resolution, full-length image of the web page 610.

Figure 6:
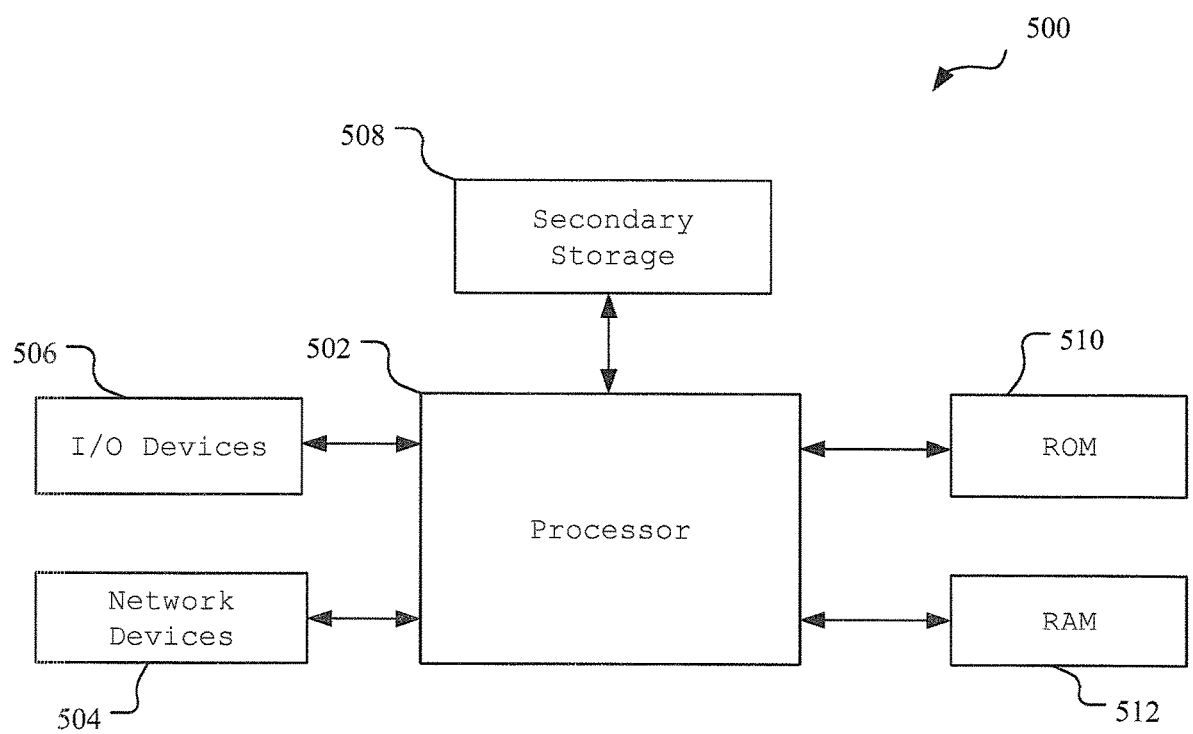
FIG. 6 illustrates a system suitable for implementing one or more embodiments of the present disclosure.

FIG. 6 illustrates a system suitable for implementing one or more embodiments of the present disclosure. System 500 may be used in connection with other embodiments of the disclosure to carry out any of the above-referenced functions and/or serve as a computing device for performing the functions of the lead generator 120 and/or the verification server 130 of FIG. 1. The computer system 500 includes a processor 502 (which may be referred to as a central processor unit or CPU) that is in communication with memory devices including secondary storage 508, read only memory (ROM) 510, random access memory (RAM) 512, input/output (I/O) device 506, and network connectivity devices 504. The processor 502 may be implemented as one or more CPU chips.

The secondary storage 508 typically includes one or more disk drives or tape drives and is used for non-volatile storage of data and as an over-flow data storage device if RAM 512 is not large enough to hold all working data. Secondary storage 508 may be used to store programs that are loaded into RAM 512 when such programs are selected for execution. Secondary storage devices 508 may include a variety of types of storage media such as, for example, floppy disk drives, hard disk drives, CD ROM drives, DVD ROM drives, magnetic tape drives, solid state devices, or other suitable storage media. Although this embodiment employs a plurality of disk drives 508, a single disk drive 508 may be used without departing from the scope of the disclosure. The ROM 510 is used to store instructions and perhaps data that are read during program execution. ROM 510 is a non-volatile memory device that typically has a small memory capacity relative to the larger memory capacity of secondary storage. The RAM 512 is used to store volatile data and perhaps to store instructions. Access to both ROM 510 and RAM 512 is typically faster than to secondary storage 508.

I/O devices 506 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 504 may take the form of modems, modem banks, Ethernet cards, universal serial bus (USE) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. The network devices 504 may be connected to a computer network or a variety of other communicative platforms including, but not limited to, a public or private data network; a local area network (LAN); a metropolitan area network (MAN); a wide area network (WAN); a wire line or wireless network; a local, regional, or global communication network; an optical network; a satellite network; an enterprise intranet; other suitable communication links; or any combination of the preceding. These network connectivity devices 504 may enable the processor 502 to communicate with an Internet or one or more intranets. With such a network connection, it is contemplated that the processor 502 might receive information from the network, or might output information to the network in the course of performing the above-described method steps. Such information, which is often represented as a sequence of instructions to be executed using processor 502, may be received from and outputted to the network, for example, in the form of a computer data signal embodied in a carrier wave.

Such information, which may include data or instructions to be executed using processor 502 for example, may be received from and outputted to the network, for example, in the form of a computer data baseband signal or signal embodied in a carrier wave. The baseband signal or signal embodied in the carrier wave generated by the network connectivity devices 504 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 502 executes instructions, codes, computer programs, scripts, as such, for performing the processes discussed in the present disclosure. The instructions, codes, computer programs, or scripts may be accesses from hard disk, floppy disk, optical disk (these various disk based systems may all be considered secondary storage 508), ROM 510, RAM 512, or the network connectivity devices 504.

Although FIG. 6 provides one embodiment of a computer system that may be utilized with other embodiments of the disclosure, such other embodiments may additionally utilize computers other than general purpose computers as well as general purpose computers without conventional operating systems. Additionally, embodiments of the disclosure may also employ multiple computer systems 500 or other computers networked together in a computer network. Most commonly, multiple general purpose computers 500 or other computers may be networked through the Internet and/or in a client server network. Embodiments of the disclosure may also be used with a combination of separate computer networks each linked together by a private or a public network.

Several embodiments of the disclosure may include logic contained within a non-transitory storage medium. In the embodiment of FIG. 6, the logic includes computer software executable on the system 500. The medium may include the RAM 512, the ROM 510, the disk drives 508, or other mediums. In other embodiments, the logic may be contained within hardware configuration or a combination of software and hardware configurations.

The logic may also be embedded within any other suitable medium without departing from the scope of the disclosure.

It will be understood that well known processes have not been described in detail and have been omitted for brevity. Although specific steps, structures and materials may have been described, the present disclosure may not be limited to these specifics, and others may be substituted as it is well understood by those skilled in the art, and various steps may not necessarily be performed in the sequences shown.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other products shown or discussed as directly coupled or communicating with each other may be coupled through some interface or device, such that the products may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method comprising:
   receiving a first request at a lead verification server from a web browser in response to the web browser visiting a web page of a lead generating website and executing a lead verification service script, the lead generating website configured to collect lead data for a lead generator;
   responding to the first request at the lead verification server by sending a reference key to the web browser;
   collecting information about the lead generating website and information associated with a user of the web browser;
   associating the collected information with the reference key;
   receiving, from an interested third party that is separate from the lead generating website and the lead generator after the interested third party receives the lead data and the reference key from the lead generator, a second request for verification of the lead data, the second request including the reference key; and
   in response to the second request, sending at least some of the collected information to the interested third party.

2. The method of claim 1, wherein the collected information comprises a copy of a complete HyperText Markup Language (HTML) of the web page.

3. The method of claim 1, further comprising:
   sending verification data to the web browser along with the reference key;
   receiving a third request at the lead verification server from the web browser, the third request containing the reference key and additional data that is generated based on the verification data; and
   attempting to verify an integrity of the third request by evaluating whether the additional data matches expected data.

4. The method of claim 3, wherein:
   the verification data comprises a second script to be executed by the web browser, and
   attempting to verify the integrity of the third request includes whether a value generated using the second script executed by the web browser and included in the third request matches an expected value.

5. The method of claim 3, further comprising:
   recording a suspicion along with the collected information when the integrity of the third request cannot be verified.

6. An apparatus comprising:
   at least one communication interface configured to send and receive information;
   at least one memory configured to store instructions; and
   at least one processing device configured to execute the instructions stored in the at least one memory, the instructions when executed configured to cause the at least one processing device to:
      receive a first request from a web browser in response to the web browser visiting a web page of a lead generating website configured to collect lead data for a lead generator and executing a lead verification service script;
      respond to the first request by sending a reference key to the web browser;
      collect information about the lead generating website and information associated with a user of the web browser;
      associate the collected information with the reference key;
      receive, from an interested third party that is separate from the lead generating website and the lead generator after the interested third party receives the lead data and the reference key from the lead generator, a second request for verification of the lead data, the second request including the reference key; and
      in response to the second request, send at least some of the collected information to the interested third party.

7. The apparatus of claim 6, wherein the collected information comprises a copy of a complete HyperText Markup Language (HTML) of the web page.

8. The apparatus of claim 6, wherein the instructions when executed are further configured to cause the at least one processing device to:
   send verification data to the web browser along with the reference key;
   receive a third request from the web browser, the third request containing the reference key and additional data that is generated based on the verification data; and
   attempt to verify an integrity of the third request by evaluating whether the additional data matches expected data.

9. The apparatus of claim 8, wherein:
   the verification data comprises a second script to be executed by the web browser, and
   the instructions that when executed are configured to cause the at least one processing device to attempt to verify the integrity of the third request comprise:
      instructions that when executed are configured to determine whether a value generated using the second script executed by the web browser and included in the third request matches an expected value.

10. The apparatus of claim 8, wherein the instructions when executed are further configured to cause the at least one processing device to:
    record a suspicion along with the collected information when the integrity of the third request cannot be verified.

11. The method of claim 1, wherein the collected information comprises a screenshot of the web page or a form being submitted by the user of the web browser.

12. The apparatus of claim 6, wherein the collected information comprises a screenshot of the web page or a form being submitted by the user of the web browser.

13. A non-transitory computer readable medium embodying instructions that when executed cause at least one processing device to:
    receive a first request from a web browser in response to the web browser visiting a web page of a lead generating website configured to collect lead data for a lead generator and executing a lead verification service script;
    respond to the first request by sending a reference key to the web browser;
    collect information about the lead generating website and information associated with a user of the web browser;
    associate the collected information with the reference key;
    receive, from an interested third party that is separate from the lead generating website and the lead generator after the interested third party receives the lead data and the reference key from the lead generator, a second request for verification of the lead data, the second request including the reference key; and
    in response to the second request, send at least some of the collected information to the interested third party.

14. The non-transitory computer readable medium of claim 13, wherein the collected information comprises a copy of a complete HyperText Markup Language (HTML) of the web page.

15. The non-transitory computer readable medium of claim 13, further comprising instructions that when executed cause the at least one processing device to:
send verification data to the web browser along with the reference key;
receive a third request from the web browser, the third request containing the reference key and additional data that is generated based on the verification data; and
attempt to verify an integrity of the third request by evaluating whether the additional data matches expected data.

16. The non-transitory computer readable medium of claim 15, wherein:
the verification data comprises a second script to be executed by the web browser; and
the instructions that when executed cause the at least one processing device to attempt to verify the integrity of the third request comprise:
instructions that when executed cause the at least one processing device to determine whether a value generated using the second script executed by the web browser and included in the third request matches an expected value.

17. The non-transitory computer readable medium of claim 15, further comprising instructions that when executed cause the at least one processing device to:
record a suspicion along with the collected information when the integrity of the third request cannot be verified.

18. The non-transitory computer readable medium of claim 13, wherein the collected information comprises a screenshot of the web page or a form being submitted by the user of the web browser.

19. An apparatus comprising:
at least one memory configured to store instructions; and
at least one processing device configured to execute the instructions stored in the at least one memory, the instructions configured when executed to cause the at least one processing device to:
provide a unique identifier to a web browser in response to the web browser accessing a hosting web page and executing a lead verification service script;
receive from the web browser lead information that comprises:
a uniform resource locator (URL) associated with the hosting web page or a form presented on the hosting web page;
a timestamp associated with the web browser accessing the hosting web page;
a network address associated with the web browser; and
a screenshot of at least one of the hosting web page or the form;
associate the unique identifier and the received lead information to create a certificate; and
provide the certificate to a requestor in response to a request from the requestor to verify an authenticity of the lead information after the requestor receives the lead information and the unique identifier, wherein the request includes the lead information and the unique identifier.

20. The apparatus of claim 19, wherein the certificate lacks personally identifiable information about a user of the web browser in the URL or the screenshot.

* * * * *